Figure 1:
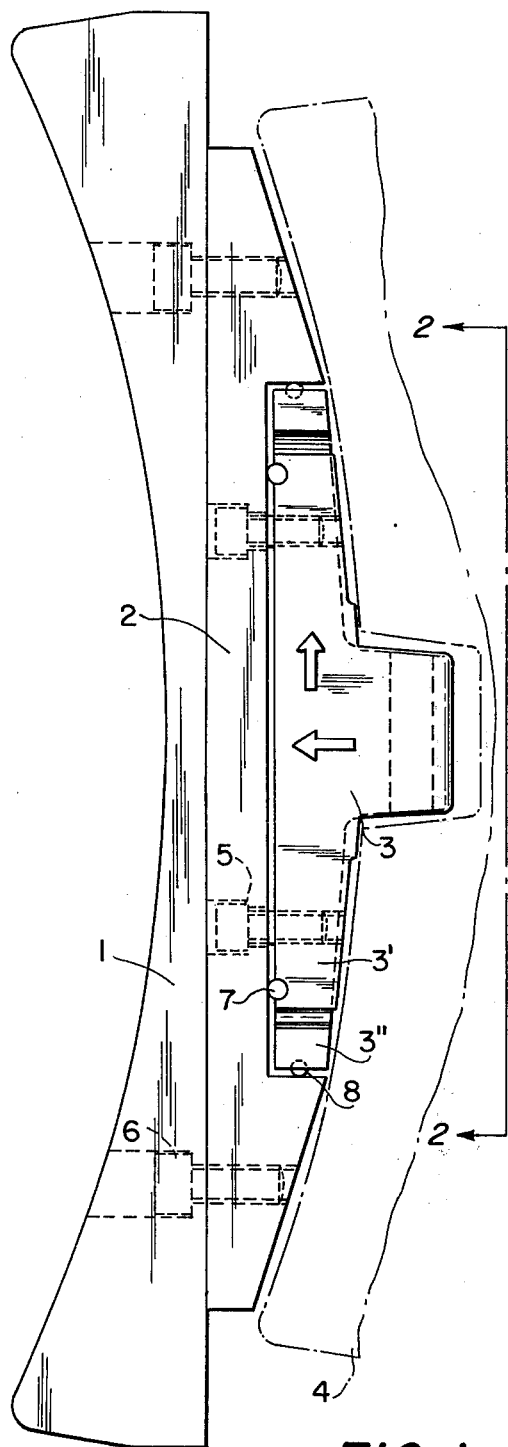

United States Patent [19]

Anderberg et al.

[11] 4,016,755
[45] Apr. 12, 1977

[54] METHOD AND DEVICE FOR DYNAMICALLY MEASURING BRAKE FORCES

[75] Inventors: Paul-Henry Botvid Anderberg, Hollviksnas; Hans Gunnar Günther Hambitzer, Lund; Nils Börje Lennart Sander, Malmo, all of Sweden

[73] Assignee: Svenska Aktiebolaget Bromsregulator, Malmo, Sweden

[22] Filed: Aug. 26, 1975

[21] Appl. No.: 607,811

[30] Foreign Application Priority Data

Sept. 6, 1974 Sweden .............................. 7411284

[52] U.S. Cl. ................................................. 73/121
[51] Int. Cl.² .......................................... G01L 5/28
[58] Field of Search ............................ 73/121, 129

[56] References Cited

UNITED STATES PATENTS

| 1,951,597 | 3/1934 | Dale | 73/129 |
| 2,124,960 | 7/1938 | Waring et al. | 73/129 |
| 3,280,623 | 10/1966 | Saxl | 73/144 |
| 3,415,115 | 12/1968 | Newell | 73/121 |
| 3,782,185 | 1/1974 | Hassenauer et al. | 73/121 |

OTHER PUBLICATIONS

G. C. Trail, Tensometer, Def. Pub., T934,002 (Filed Sept. 1973), Published May 6, 1975.
*Mechanical Measurements*, T. G. Beckwith and N. L. Buck, p. 257, Oct. 1961.

Primary Examiner—James J. Gill
Assistant Examiner—Anthony V. Ciarlante
Attorney, Agent, or Firm—Laurence R. Brown

[57] ABSTRACT

The brake block has incorporated means such as strain gauges for measuring dynamic brake forces in two normal coordinate directions.

2 Claims, 4 Drawing Figures

U.S. Patent  April 12, 1977  Sheet 1 of 2  4,016,755

METHOD AND DEVICE FOR DYNAMICALLY MEASURING BRAKE FORCES

The demands for increased utilization of railway rolling stock, for higher speeds and heavier trains necessitate more and more effective brake arrangements. It is therefore of utmost importance to find a way to measure brake forces. Hitherto such measurements have been made statically. This method gives, of course, a better indication of the real braking power of a vehicle than the theoretically calculated brake force using an assumed efficiency of the brake rigging.

One obvious drawback with this method is, however, that only the force in the application direction can be measured. To determine the true brake forces these must be measured dynamically, i.e., on a running vehicle. It is essential to measure both the friction force and the force in the application direction or, at a brake block, both the tangential and the radial forces, as these forces vary due to the variations in efficiency of the brake rigging and conditions of adhesion in the contact between wheel and brake block respectively.

This invention thus relates to a method of dynamically measuring the forces occurring at the braking of a braked part, for example a wheel, by means of a braking part, for example a brake block, and to a device for carrying out this method.

Some attempts have earlier been made to attain such a measurement, but no such attempt has been successful. It is especially important to obviate complicated and heavy devices for the measurement in the brake rigging, as such devices may disturb the proper and normal function of the rigging. Besides, it should be easy to carry out the measurement.

The method according to the invention is characterised in that the brake forces in both the friction force and normal force directions are transmitted via elastically deformable sections of the braking part and that the forces in the form of the deformations of these sections are measured by means of strain gauges.

In this way the two forces may be separated in the braking part and taken out in the form of electric signals from this part, for example a brake block, which is only slightly modified and adds no weight to the brake rigging.

A device for carrying out the method above is characterised by elastically deformable sections of the braking part, by means for transmitting the brake forces in the friction force and normal force directions via the sections and by strain gauges on the sections.

Used at a block brake the invention is useful for
dynamic measurement of the radial brake block force,
dynamic measurement of the tangential friction force,
dynamic measurement of the efficiency of the brake arrangement,
determination of the variation in friction force depending on temperature, speed, block load, block material, etc.

Corresponding fields of application are applicable for disc brakes.

Figure 2:
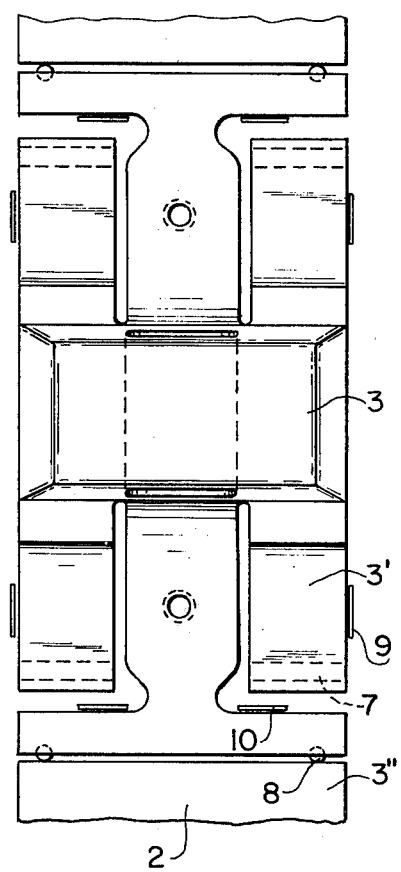
Figure 3:
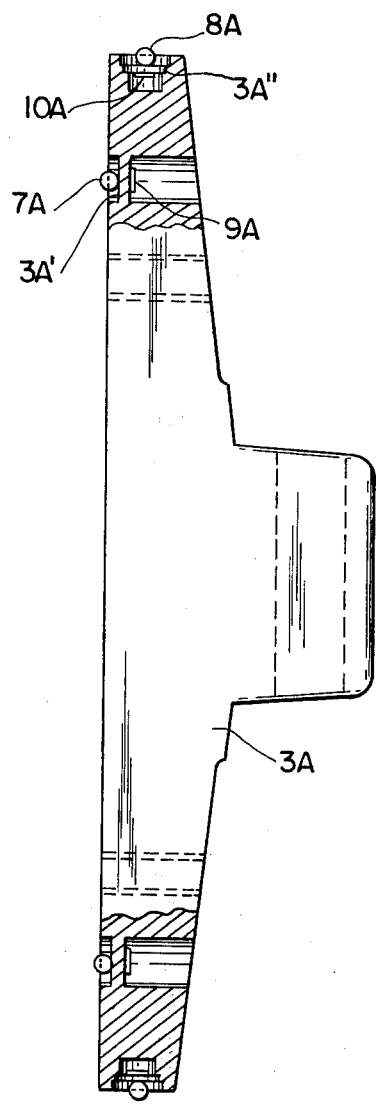
Figure 4:
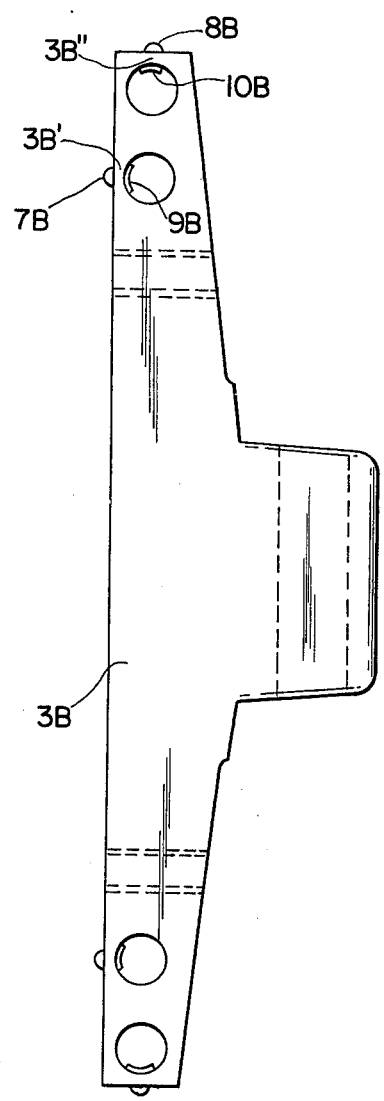

The invention shall be described in further detail below, reference being made to the accompanying drawings, in which FIG. 1 is a side view of a device according to the invention, FIG. 2 is a top view of a measuring part in the device taken along section lines 2—2 of FIG. 1, and FIGS. 3 and 4 are side views to a somewhat larger scale of modified measuring parts for a device according to the invention.

At a measurement of brake forces an ordinary brake block for a railway vehicle block brake is replaced by a modified measuring block, primarily comprising three parts: a part 1 of friction material, a friction material holding part 2, and a measuring part 3, connected in a way to be described below. The measuring block is mounted to a brake block holder 4 shown in dash-dotted lines in FIG. 1 in an ordinary way not described here.

The measuring part 3 and the friction material holding part 2 are held together by screws 5 in such a way as to enable the measuring part 3 to move to a small extent relative the part 2 in two directions indicated by arrows in FIG. 1, namely in the radial and tangential direction respectively of the wheel to be braked. In a practical embodiment a ball guiding is arranged between the two parts 2 and 3. The guiding forms no part of the invention and is omitted from the drawing for the sake of clarity.

The friction material part 1 is a conventional brake block planed on the convex surface to the shown shape. It is fixed to the friction material holding part 2 by means of screws 6.

A recess with a size corresponding to that of the measuring part 3 is arranged in the friction material holding part 2. Force transmitting means 7 and 8 in the form of balls, rollers, or the like for the transmission of forces between the two parts 2 and 3 in the radial and tangential direction of the wheel respectively are attached to the measuring part 3.

As appears most clearly in FIG. 2, elastically deformable legs 3' and 3'' extend from the main and nondeformable portion of the measuring part 3. Strain gauges 9 and 10 are attached to these legs in order to give an electric indication of the elastic deformation of these legs 3' and 3'' respectively under the influence of the radial and tangential forces indicated by arrows in FIG. 1.

It is namely apparent that a radial force will be transmitted via the force transmitting means 7 and cause a certain deformation of each leg 3' directly corresponding to the radial force. In the same manner a tangential force will be transmitted via one of the pairs of force transmitting means 8 and cause a certain deformation of each corresponding leg 3'' directly corresponding to the tangential force.

In this manner it has been possible to obtain a complete separation of the different dynamic forces occurring at the braking of a wheel by means of a brake block.

The strain gauges are connected to an instrument for registration of the forces or rather the deformation of the respective legs. These connections, the instrument, and the circuit diagram are not shown and form no part of the invention.

The embodiment accordng to FIGS. 1 and 2 is the preferred one, but also other solutions are possible within the scope of the invention. Two modifications are thus illustrated in FIGS. 3 and 4 showing modified measuring parts.

In FIG. 3 the elastically deformable sections in a measuring part 3A have the form of "membranes" 3A' and 3A'' of even thickness provided by holes in the measuring part and subjected to the forces via force transmitting means 7A and 8A in the form of balls. On the opposite side of the membranes strain gauges 9A and 10A are attached for measuring the deformation.

In FIG. 4 the elastically deformable sections in a measuring part 3B have the form of relatively thin portions 3B' and 3B'' provided by transverse bores in the measuring part and subjected to the forces via force transmitting means 7B and 8B preferably in the form of rollers. Strain gauges 9B and 10B are mounted in the bores at the thin portions 3B' and 3B'' for measuring the deformation.

Many modifications are of course possible within the scope of the appended claims. It is especially to be noted that the invention is not limited to the measurement of forces at block brakes. The main idea to establish elastically deformable sections and to measure the deformation thereof by means of strain gauges is equally applicable to disc brakes. Also, the same technique may be used for measuring brake forces at automotive brakes.

What is claimed is:

1. Dynamic brake force measuring means comprising in combination, a brake mechanism including a braking block and a braking friction material for contacting a rotating member preferably a railway wheel, a measuring part immovably affixed to said braking block at selected positions with said measuring part having at least two elastically deformable sections extending from the affixed positions responsive to deform respectively to brake forces transmitted thereto by said braking friction material through said braking block in different coordinate directions signifying radial and tangential brake forces, separate strain gauge means affixed respectively to said two deformable sections for reading out separately the forces appearing in said different coordinate directions dynamically during the braking operation thereby to derive separate radial and tangential brake forces at different speeds and loads and braking forces, and directional force transmitting members respectively bearing on both said two deformable sections and braking block in said coordinate directions to transmit dynamic braking forces between said braking block and said measuring part deformable sections.

2. Means as defined in claim 1 wherein said force transmitting members comprise displaceable rollers.

* * * * *